United States Patent

Morini et al.

[11] Patent Number: 6,048,818
[45] Date of Patent: Apr. 11, 2000

[54] COMPONENTS AND CATALYSTS FOR THE POLYMERIZATION OF OLEFINS

[75] Inventors: Giampiero Morini, Padua; Giulio Balbontin; John Chadwick, both of Ferrara; Antonio Cristofori, S.M. Maddalena; Enrico Albizzati, Arona, all of Italy

[73] Assignee: Montell Technology Company bv, Netherlands

[21] Appl. No.: 09/094,309

[22] Filed: Jun. 9, 1998

[30] Foreign Application Priority Data

Jun. 9, 1997 [IT] Italy .................................. MI97A1348

[51] Int. Cl.⁷ ...................................................... B01J 31/00
[52] U.S. Cl. .......................... 502/127; 502/102; 502/103; 502/118; 502/125
[58] Field of Search ..................... 502/102, 103, 502/118, 125, 127

[56] References Cited

U.S. PATENT DOCUMENTS

| | | |
|---|---|---|
| 4,220,554 | 9/1980 | Scata et al. . |
| 4,298,718 | 11/1981 | Mayr et al. . |
| 4,399,054 | 8/1983 | Ferraris et al. . |
| 4,495,338 | 1/1985 | Mayr et al. . |
| 5,583,188 | 12/1996 | Kashiwa et al. .................. 526/125.6 |
| 5,606,008 | 2/1997 | Sakashita et al. .................. 528/199 |

FOREIGN PATENT DOCUMENTS

| | | |
|---|---|---|
| 086 473 A2 | 8/1983 | European Pat. Off. . |
| 086 644 A2 | 8/1983 | European Pat. Off. . |
| 125 911 B1 | 11/1984 | European Pat. Off. . |
| 395 083 A2 | 10/1990 | European Pat. Off. . |
| 553 805 A1 | 8/1993 | European Pat. Off. . |
| 553 806 A1 | 8/1993 | European Pat. Off. . |

Primary Examiner—Elizabeth D. Wood
Attorney, Agent, or Firm—Bryan Cave LLP

[57] ABSTRACT

The present invention relates to a solid catalyst component for the polymerization of olefins $CH_2=CHR$ in which R is hydrogen or a hydrocarbyl radical with 1–12 carbon atoms, comprising a titanium compound, having at least a Ti-halogen bond and an electron donor compound supported on a Mg halide, in which said electron donor compound is selected from esters of malonic acids of formula (I):

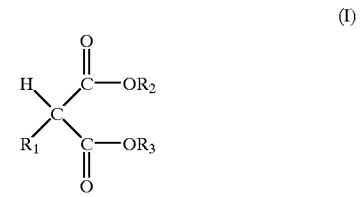

wherein $R_1$ is a $C_5$–$C_{20}$ linear or branched alkyl, a $C_5$–$C_{20}$ cycloalkyl, a $C_7$–$C_{20}$ arylalkyl or alkylaryl group; $R_2$ and $R_3$, equal to or different from each other, are $C_1$–$C_3$ alkyl, cycloalkyl. Said catalyst components when used in the polymerization of olefins, and in particular of propylene, are capable to give high yields and polymers having high insolubility in xylene.

17 Claims, No Drawings

COMPONENTS AND CATALYSTS FOR THE POLYMERIZATION OF OLEFINS

The present invention relates to catalyst components for the polymerization of olefins, to the catalyst obtained therefrom and to the use of said catalysts in the polymerization of olefins $CH_2=CHR$ in which R is hydrogen or a hydrocarbyl radical with 1–12 carbon atoms. In particular the present invention relates to catalyst components, suitable for the stereospecific polymerization of olefins, comprising a titanium compound having at least a Ti-halogen bond and an electron donor compound selected from esters of malonic acid having a particular formula supported on a Mg halide. Said catalyst components used in the polymerization of olefins, and in particular of propylene, are capable to give polymers in high yields and with high isotactic index expressed in terms of high xylene insolubility.

The use of some esters of malonic acid as internal electron donors in catalysts for the polymerization of propylene is already known in the art.

EP-A-86473 discloses a catalyst for the polymerization of olefins comprising (a) an alkyl compound, (b) an electron donor compound having certain reactivity features towards $MgCl_2$ and (c) a solid catalyst component comprising, supported on $MgCl_2$, a Ti halide and an electron donor selected from many classes of ester compounds including malonates. In particular, the use of diethyl allylmalonate as an internal donor in a catalyst for the polymerization of propylene is exemplified.

From EP-A-86644 is known the use of diethyl-n-butyl malonate and diethylisopropylmalonate as internal donors in Mg-supported catalysts for the polymerization of propylene in which the external donor is a heterocyclic compound or a ketone. The European patent EP-B-125911 discloses a process for producing (co)polymers which comprises (co)polymerizing at least one olefin, optionally with a diolefin, in the presence of a catalyst composed of (a) a solid catalyst component containing Mg, Ti and an electron donor compound selected from esters of polycarboxylic acids, (b) an organometallic compound of a metal selected from group I to III of the periodic table, and (c) an organosilicon compound having a Si—O—C or a Si—N—C bond. Examples of preferred esters compounds include diethyl-2-methylmalonate, diethyl-2-butylmalonate and diethyl-2-phenyl-malonate. Only the use of a catalyst containing diethyl-2-phenylmalonate has been exemplified in the preparation of polypropylene.

However, a common drawback experienced in the use of the above mentioned malonates was represented by a poor polymerization yield and/or a not suitable isotactic index of the final polymer.

It has now surprisingly been found that if specific esters of malonic acid are used as internal donor, catalyst components capable to give an excellent balance between polymerization yield and isotactic index of the polymer are obtained.

It is therefore an object of the present invention a solid catalyst component for the polymerization of olefins $CH_2=CHR$ in which R is hydrogen or a hydrocarbyl radical with 1–12 carbon atoms, comprising a titanium compound, having at least a Ti-halogen bond, and an electron donor compound supported on a Mg halide, in which said electron donor is selected from esters of malonic acids of formula (I):

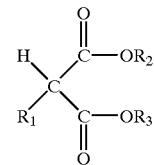

wherein $R_1$ is a $C_5$–$C_{20}$ linear or branched alkyl, a $C_5$–$C_{20}$ cycloalkyl, a $C_7$–$C_{20}$ arylalkyl or alkylaryl group; $R_2$ and $R_3$, equal to or different from each other, are $C_1$–$C_3$ alkyl, cycloalkyl. Preferably $R_1$ is a $C_5$–$C_{20}$ primary alkyl, a $C_5$–$C_{20}$ cycloalkyl, a $C_7$–$C_{20}$ or arylalkyl group.

Specific examples of compounds are diethyl-2-dodecylmalonate, diethyl-2-(2-pentyl)malonate, diethyl-2-cyclohexylmalonate, diethyl-2-cyclohexylmethylmalonate, dimethyl-2-cyclohexylmethyl-malonate.

It has been found that if R. belongs to one of the above defined categories, the yields in the polymerization process are much higher than in the prior art wherein $C_1$–$C_4$ alkyl or phenyl substituents were used.

The magnesium halide is preferably $MgCl_2$ in active form which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$, where n is the valence of titanium and y is a number between 1 and n, can be used.

The preparation of the solid catalyst component can be carried out according to several methods.

According to one of these methods, the magnesium dichloride in an anhydrous state, the titanium compound and the electron donor compound of formula (I) are milled together under conditions in which activation of the magnesium dichloride occurs. The so obtained product can be treated one or more times with an excess of $TiCl_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound and the electron donor compound of formula (I), is treated with halogenated hydrocarbons such as 1,2-dichloroethane, chlorobenzene, dichloromethane etc. The treatment is carried out for a time between 1 and 4 hours and at a temperature of from 40° C to the boiling point of the halogenated hydrocarbon. The product obtained is then generally washed with inert hydrocarbon solvents such as hexane.

According to another method, magnesium dichloride is preactivated according to well known methods and then treated with an excess of $TiCl_4$ at a temperature of about 80 to 135° C. which contains, in solution, an electron donor compound of formula (I). The treatment with $TiCl_4$ is repeated and the solid is washed with hexane in order to eliminate any non-reacted $TiCl_4$.

A further method comprises the reaction between magnesium alcoholates or chloroalcoholates (in particular chloroalcoholates prepared according to U.S. Pat. No. 4,220,554) and an excess of TiCl$_4$ containing the electron donor compound (I) in solution at a temperature of about 80 to 120° C.

According to a preferred method, the solid catalyst component can be prepared by reacting a titanium compound of formula Ti(OR)$_{n-y}$X$_y$, where n is the valence of titanium and y is a number between 1 and n, preferably TiCl$_4$, with a magnesium chloride deriving from an adduct of formula MgCl$_2$.pROH, where p is a number between 0,1 and 6 and R is a hydrocarbon radical having 1–18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100–130° C.). Then, the emulsion is quickly quenched thereby causing the solidification of the adduct in form of spherical particles. Examples of spherical adducts prepared according to this procedure are described in U.S. Pat. No. 4,399,054. The so obtained adduct can be directly reacted with the Ti compound or it can be previously subjected to thermal controlled dealcoholation (80–130° C.) so as to obtain an adduct in which the number of moles of alcohol is generally lower than 2.5 preferably between 0.1 and 1.5. The reaction with the Ti compound can be carried out by suspending the adduct (dealcoholated or as such) in cold TiCl$_4$ (generally 0° C.); the mixture is heated up to 80–130° C. and kept at this temperature for 0.5–2 hours. The treatment with TiCl$_4$ can be carried out one or more times. The electron donor compound of formula (I) can be added during the treatment with TiCl$_4$. The treatment with the electron donor compound can be repeated one or more times.

The preparation of catalyst components in spherical form are described for example in European Patent Applications EP-A-395083, EP-A-553805, EP- A-553806.

The solid catalyst components obtained according to the above method show a surface area (by B.E.T. method) generally between 20 and 500 m$^2$/g and preferably between 50 and 400 m$^2$/g, and a total porosity (by B.E.T. method) higher than 0.2 cm$^3$/g preferably between 0.2 and 0.6 cm$^3$/g.

A further method to prepare the solid catalyst component of the invention comprises halogenating magnesium dihydrocarbyloxide compounds, such as magnesium dialkoxide or diaryloxide, with solution of TiCl$_4$ in aromatic hydrocarbon (such as toluene, xylene etc.) at temperatures between 80 and 130° C. The treatment with the TiCl$_4$ in aromatic hydrocarbon solution can be repeated one or more times, and the electron donor compound of formula (I) is added during one or more of these treatments.

In any of these preparation methods the desired electron donor compound of formula (I) can be added as such or, in an alternative way, it can be obtained in situ by using an appropriate precursor capable to be transformed in the desired electron donor compound by means, for example, of known chemical reactions such as esterification, transesterification etc. Generally, the electron donor compound of formula (I) is used in molar ratio with respect to the MgCl$_2$ of from 00.1 to 1 preferably from 0.05 to 0.5.

The solid catalyst component according to the present invention are converted to the catalysts for the polymerization of olefins by reacting them with organoaluminium compounds according to known methods.

In particular, it is an object of the present invention a catalyst for the polymerization of olefins CH$_2$=CHR, in which R is hydrogen or a hydrocarbyl radical with 1–12 carbon atoms, comprising the product of the reaction between:

(i) a solid catalyst component comprising a titanium compound having at least a Ti-halogen bond, and an electron donor compound supported on a Mg halide in active form, in which said electron donor compound is selected from esters of malonic acids of formula (I):

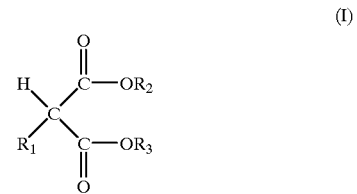

(I)

where R$_1$ is a C$_5$–C$_{20}$ linear or branched alkyl, a C$_5$–C$_{20}$ cycloalkyl, a C$_7$–C$_{20}$ arylalkyl or alkylaryl group; R$_2$ and R$_3$, equal to or different from each other, are C$_1$–C$_3$ alkyl, cycloalkyl. Preferably R$_1$ is a C$_5$–C$_{20}$ primary alkyl, a C$_5$–C$_{20}$ cycloalkyl, a C$_7$–C$_{20}$ or arylalkyl group;

(ii) an alkylaluminium compound and, (iii) one or more electron-donor compounds (external donor).

The alkylaluminium compound (ii) is preferably chosen among the trialkyl aluminium compounds such as for example triethylaluminium, triisobutylaluminium, tri-n-butylaluminium, tri-n-hexylaluminium, tri-n-octylaluminium. It is also possible to use mixtures of trialkylaluminium's with alkylaluminium halides, alkylaluminium hydrides or alkylaluminium sesquichlorides such as AlEt$_2$Cl and Al$_2$Et$_3$Cl$_3$.

The external donor (iii) can be of the same type or it can be different from the internal donor of formula (I). Suitable external electron-donor compounds include the ethers, the esters, the amines, heterocyclic compounds and particularly 2,2,6,6-tetramethyl piperidine, the ketones and the 1,3-diethers of the general formula (II):

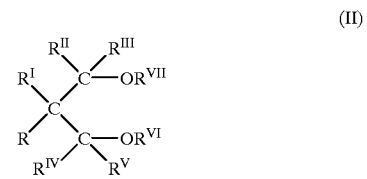

(II)

wherein R and R$^I$, R$^{II}$ R$^{III}$, R$^{IV}$ and R$^V$ equal or different to each other, hydrogen or hydrocarbon radicals having from 1 to 18 carbon atoms, and R$^{VI}$ and R$^{VII}$, equal or different from each other, have the same meaning of R—R$^I$ except that they cannot be hydrogen; one or more of the R—R$^{VII}$ groups can be linked to form a cycle.

Particularly preferred are the external donors chosen among silicon compounds of formula Ra$^5$Rb$^6$Si(OR$^7$)c, where a and b are integer from 0 to 2, c is an integer from 1 to 4 and the sum (a+b+c) is 4; R$^5$, R$^6$ and R$^7$ are alkyl, cycloalkyl or aryl radicals with 1–18 carbon atoms. Particularly preferred are silicon compounds in which a is 1, b is 1 and c is 2. Among the compounds of this preferred class, particularly preferred are the compounds in which R$_5$ and/or R$_6$ are branched alkyl, cycloalkyl or aryl groups with 3–10 carbon atoms and R$_7$ is a C$_1$–C$_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane. Moreover, are also preferred the silicon compounds in which a is 0, c is 3 and $R^6$ is a branched alkyl or cycloalkyl group and $R^7$ is methyl. Examples of such preferred silicon compounds are cyclohexyltrimethoxysilane, t-butyltrimethoxysilane and thexyltrimethoxysilane.

The electron donor compound (iii) is used such an amount to give a molar ratio between the organoaluminium compound and said electron donor compound (iii) of from 0.1 to 500 preferably from 1 to 300 and more preferably from 3 to 100. As previously indicated, when used in the (co) polymerization of olefins, and in particular of propylene, the catalysts of the invention allow to obtain, with high yields, polymers having a high isotactic index (expressed by high xylene insolubility X.I.), thus showing an excellent balance of properties. This is particularly surprising in view of the fact that, as it can be seen from the comparison examples herebelow reported, the use as internal electron donors of malonate compounds known in the art gives poor results in term of yields and/or xylene insolubility thereby showing a very insufficient balance of properties.

Therefore, it constitutes a further object of the present invention a process for the (co)polymerization of olefins $CH_2=CHR$, in which R is hydrogen or a hydrocarbyl radical with 1–12 carbon atoms, carried out in the presence of a catalyst comprising the product of the reaction between:

(i) a solid catalyst component comprising a titanium compound having at least a Ti-halogen bond, and an electron donor compound supported on a Mg halide in active form, in which said electron donor compound is selected from esters of malonic acids of formula (I):

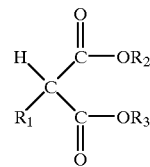

(I)

where $R_1$ is a $C_5-C_{20}$ linear or branched alkyl, a $C_5-C_{20}$ cycloalkyl, a $C_7-C_{20}$ arylalkyl or alkylaryl group; $R_2$ and $R_3$, equal to or different from each other, are $C_1-C_3$ alkyl, cycloalkyl,. Preferably $R_1$ is a $C_5-C_{20}$ primary alkyl, a $C_5-C_{20}$ cycloalkyl, a $C_7-C_{20}$ or arylalkyl group (ii) an alkylaluminium compound and, (iii) one or more electron-donor compounds (external donor).

Said polymerization process can be carried out according to known techniques for example slurry polymerization using as diluent an inert hydrocarbon solvent, or bulk polymerization using the liquid monomer (for example propylene) as a reaction medium. Moreover, it is possible carrying out the polymerization process in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.5 and 10 MPa, preferably between 1 and 5 MPa In the bulk polymerization the operating pressure is generally between 1 and 6 MPa preferably between 1.5 and 4 MPa Hydrogen or other compounds capable to act as chain transfer agents can be used to control the molecular weight of polymer.

The following examples are given in order to better illustrate the invention without limiting it.

CHARACTERIZATIONS

The diethyl malonates of formula (I) used in the present invention can be prepared according to known chemical synthesis as those described for example by J. March in "Advanced Organic Chemistry"0 IV Ed. (1992) pp. 464–468.

The malonates having $R_2$ and $R_3$ different from ethyl can be prepared by transesterification of the correspondent diethyl malonate as described in Example 1 of DE 2822472.

Propylene General Polymerization Procedure

In a 4 liter autoclave, purged with nitrogen flow at 70° C. for one hour, 80 ml of anhydrous hexane containing 10 mg of solid catalyst component, 7 mmoles of $AlEt_3$ and 0.35 mmoles of dicyclopentyldimethoxysilane were introduced in propylene flow at 30° C. The autoclave was closed, 3 NL of hydrogen were added and then, under stirring, 1.2 kg of liquid propylene were fed. The temperature was raised to 70° C. in five minutes and the polymerization was carried out at this temperature for two hours. The unreacted propylene was removed, the polymer was recovered and dried at 70° C. under vacuum for three hours, and then it was weighed and fractionated with oxylene to determine the amount of the xylene insoluble (X.I.) fraction at 25° C.

Determination of X.I.

2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference, the X.I. %.

EXAMPLES

Examples 1–8

Preparation of Solid Catalyst Components

Into a 500 ml four-necked round flask, purged with nitrogen, 225 ml of $TiCl_4$ were introduced at 0° C. While stirring, 10.3 g of microspheroidal $MgCl_2 \times 2.1 C_2H_5OH$ (obtained by partial thermal dealcoholation of an adduct prepared as described in ex. 2 of U.S. Pat. No. 4,399,054 but operating at 3,000 rpm instead of 10,000) were added. The flask was heated to 40° C. and 9 mmoles of malonate were thereupon added. The temperature was raised to 100° C. and maintained for two hours, then the stirring was discontinued, the solid product was allowed to settle and the supernatant liquid was siphoned off.

200 ml of fresh $TiCl_4$ were added, the mixture was reacted at 120° C. for one hour and then the supernatant liquid was siphoned off. The solid was washed six times with anhydrous hexane (6×100 ml) at 60° C. and then dried under vacuum: the malonates used, the amount of Ti (wt %) and of malonates (wt %) contained in the solid catalyst component are reported in table 1. The polymerization results are reported in table 2.

Comparative Examples 9–14

Preparation of Solid Catalyst Component

The catalyst components have been prepared according to the same procedure of the examples 1–7 except for the fact that malonates different from those of formula (I) have been used. The malonates used, the amount of Ti (wt %) and of malonates (wt %) contained in the solid catalyst component are reported in table 1. The polymerization results are reported in table 2.

TABLE 1

| | Solid catalyst component preparation | | Solid catalyst component composition | |
|---|---|---|---|---|
| Ex. | Malonate | Ti | | Malonate |
| n. | type | wt % | type | wt % |
| 1 | diethyl 2-decyl | 3.3 | diethyl 2-decyl | 12.1 |
| 2 | diethyl 2-dodecyl | 3.3 | diethyl 2-dodecyl | 10.1 |
| 3 | diethyl 2-tetradecyl | 3.5 | diethyl 2-tetradecyl | 9.7 |
| 4 | diethyl 2-hexadecyl | 3.5 | diethyl 2-hexadecyl | 10.6 |
| 5 | diethyl 2-cyclohexyl | 2.6 | diethyl 2-cyclohexyl | 13.9 |
| 6 | diethyl 2-cyclohexylmethyl | 3.6 | diethyl 2-cyclohexylmethyl | 10.8 |
| 7 | diethyl 2-benzyl | 3.6 | diethyl 2-benzyl | 10.9 |
| 8 | diethyl 2-(2-pentyl) | 3.5 | diethyl 2-(2-pentyl) | 11.2 |
| comp. 9 | diethyl 2-allyl | 3.4 | diethyl 2-alyl | 13.1 |
| comp. 10 | diethyl 2-phenyl | 3.6 | diethyl 2-phenyl | 15.1 |
| comp. 11 | diethyl 2-tert-butyl | 3.3 | diethyl 2-tert-butyl | 12.1 |
| comp. 12 | diethyl 2-methyl | 3.0 | diethyl 2-methyl | 7.8 |
| comp. 13 | dimethyl 2-isobutyl | 3.2 | dimethyl 2-isobutyl | 5.0 |
| | | | methyl-ethyl 2-isobutyl | 6.3 |
| | | | diethyl 2-isobutyl | 1.6 |
| comp. 14 | diethyl 2-isopropyl | 3.1 | diethyl 2-isopropyl | 11.2 |

TABLE 2

| Example | Yield KgPP/gCat | X.I. % |
|---|---|---|
| 1 | 38.8 | 96.4 |
| 2 | 36.9 | 96.7 |
| 3 | 43.4 | 96.0 |
| 4 | 34.8 | 96.6 |
| 5 | 33.0 | 96.7 |
| 6 | 35.2 | 96.7 |
| 7 | 31 | 96.4 |
| 8 | 33.2 | 97.2 |
| comp. 9 | 7.3 | 96.3 |
| comp. 10 | 28.3 | 95.8 |
| comp. 11 | 26.9 | 97.0 |
| comp. 12 | 15.1 | 95.7 |
| comp. 13 | 20.3 | 96.2 |
| comp. 14 | 22.5 | 96.5 |

We claim:

1. A solid catalyst component for the polymerization of olefins $CH_2=CHR$ in which R is hydrogen of a hydrocarbyl radical with 1–12 carbon atoms, comprising a titanium compound, having at least a Ti-halogen bond and an electron donor compound supported on a Mg halide, in which said electron donor compound is selected from esters of malonic acids of formula (I):

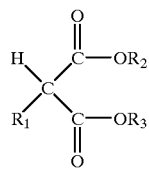

(I)

wherein $R_1$ is a $C_5$–$C_{20}$ linear or branched alkyl, a $C_5$–$C_{20}$ cycloalkyl, a $C_7$–$C_{20}$ arylalkyl or a $C_7$–$C_{20}$ alkylaryl group, $R_2$ and $R_3$, the same as or different from each other, are $C_1$–$C_3$ alkyl, or cyclopropyl.

2. A solid catalyst component according to claim 1 in which $R_1$ is a $C_5$–$C_{20}$ primary alkyl, a $C_5$–$C_{20}$ cycloalkyl, or a $C_7$–$C_{20}$ arylalkyl group.

3. A solid catalyst component according to claim 1 in which the electron donor compound of formula (I) is selected from the group consisting of diethyl-2-dodecylmalonate, diethyl-2-(2-pentyl)malonate, diethyl-2-cyclohexylmalonate, diethyl-2-cyclohexylmethylmalonate, dimethyl-2-cyclohexylmethylmalonate.

4. A solid catalyst component according to claim 1 in which the magnesium halide is $MgCl_2$ in active form.

5. A solid catalyst component according to claim 1, in which the titanium compound is $TiCl_4$ or $TiCl_3$.

6. A solid catalyst component according to claim 1 having a spherical form, a surface area between 20 and 500 $m^2/g$ and a total porosity higher than 0.2 $cm^3/g$.

7. A catalyst for the polymerization of olefins $CH_2=CHR$, in which R is hydrogen or a hydrocarbyl radical with 1–12 carbon atoms, comprising the product of the reaction between:

(i) the solid catalyst component of claim 1, (ii) an alkylaluminium compound and, (iii) one or more electron-donor compounds (external donor).

8. Catalyst according to claim 7 in which the alkylaluminium compound (ii) is a trialkyl aluminium compound.

9. Catalyst according to claim 8 in which the trialkyl aluminium compound is selected from the group consisting of triethylaluminium, triisobutylaluminium, tri-n-butylaluminium, tri-n-hexylaluminium, tri-n-octylaluminium.

10. Catalyst according to claim 7 in which the external donor (iii) is selected from 1,3-diethers of the general formula (II):

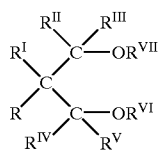

(II)

wherein R, $R^I$, $R^{II}$, $R^{III}$, $R^{IV}$, and $R^V$ are the same as or different from each other, hydrogen or hydrocarbon radicals having from 1 to 18 carbon atoms, and $R^{VI}$ and $R^{VII}$, the same as or different from each other, have the same meaning as radicals R, $R^I$, $R^{II}$, $R^{III}$, $R^{IV}$, and $R^V$ except that they cannot be hydrogen; one or more of the R, $R^I$, $R^{II}$, $R^{III}$, $R^{IV}$, and $R^V$, $R^{VI}$, and $R^{VII}$ groups can be linked to form a cycle.

11. Catalyst according to claim 7 in which the external donor (iii) is a silicon compound of formula $aR^5bR^6Si(OR^7)c$, where a and b are integers from 0 to 2, c is an integer from 1 to 4 and the sum (a+b+c) is 4; $R^5$, $R^6$ and $R^7$ are alkyl, cycloalkyl or aryl radicals with 1–18 carbon atoms.

12. Catalyst according to claim 11 in which a is 1, b is 1 and c is 2.

13. Catalyst according to claim 12 in which $R_5$ and/or $R_6$ are branched alkyl, cycloalkyl or aryl groups with 3–10 carbon atoms and $R_7$ is a $C_1$–$C_{10}$ alkyl group.

14. Catalyst according to claim 11 in which a is 0, c is 3 and $R^6$ is a branched alkyl or cycloalkyl group and $R^7$ is methyl.

15. Catalyst according to claim 11 in which the silicon compound is selected from the group consisting of methylcyclohexyldimethoxysilane, diphenyldimethoxysilane, methyl-t-butyldimethoxysilane, dicyclopentyldimethoxysilane cyclohexyltrimethoxysilane, t-butyltrimethoxysilane and thexyltrimethoxysilane.

16. A solid catalyst component according to claim 6 having a surface area between 50 and 300 $m^2/g$ and a total porosity between 0.2 and 0.6 $cm^3/g$.

17. A catalyst according to claim 13, wherein $R_7$ is a methyl group.

* * * * *